Figure 1:
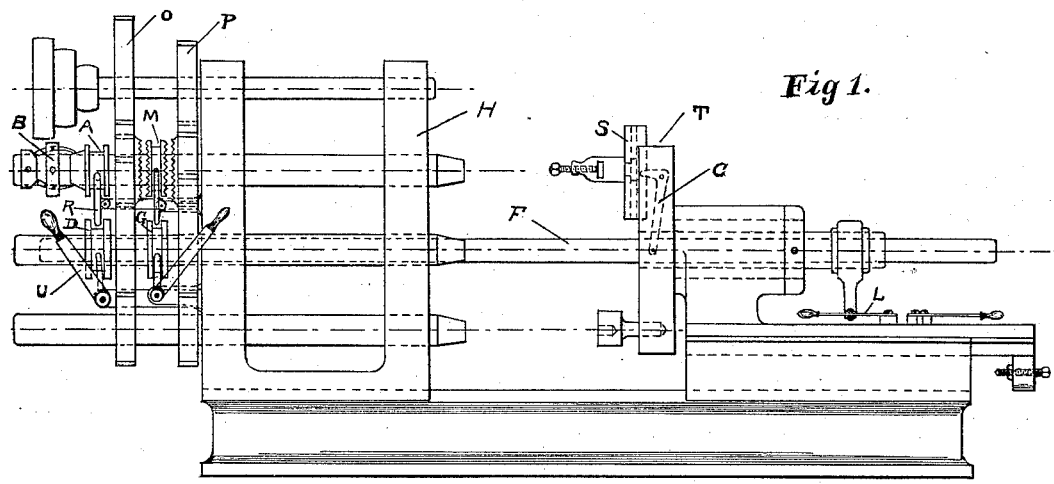
Figure 2:
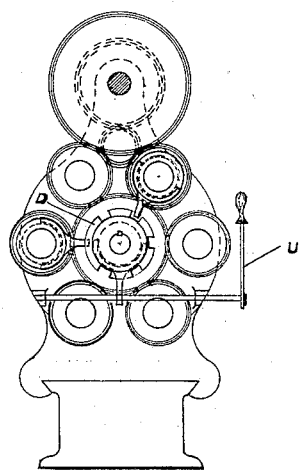
Figure 3:
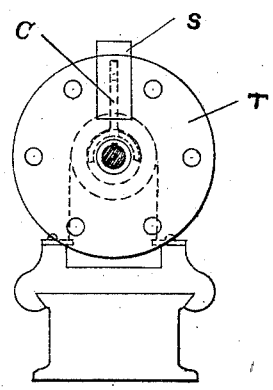

(No Model.)

E. J. McCLELLAN.
SCREW MACHINE.

No. 467,568. Patented Jan. 26, 1892.

WITNESSES
M. E. Barnett
C. H. McClellan

INVENTOR
Edward Joseph McClellan

UNITED STATES PATENT OFFICE.

EDWARD JOSEPH McCLELLAN, OF NEW YORK, N. Y.

SCREW-MACHINE.

SPECIFICATION forming part of Letters Patent No. 467,568, dated January 26, 1892.

Application filed August 21, 1891. Serial No. 403,286. (No model.)

*To all whom it may concern:*

Be it known that I, EDWARD JOSEPH MCCLELLAN, a citizen of the United States, residing in New York, in the State and county of New York, have invented a new Screw-Machine, of which the following is a specification, reference being had to the accompanying drawings.

My invention consists of a turret T, holding six or any number of tools, and a head-stock H, containing a corresponding number of spindles. When the turret is brought up, each tool acts on the work held in the corresponding spindle, and when the turret is drawn back the turret is revolved one place by suitable mechanism, and when the turret is brought up again each piece has the next succeeding operation performed on it, and the result is that one piece or more is finished every stroke of the machine. When the piece is finished, it must be cut off, and for this purpose the cut-off slide S, carried round on the turret, is provided. The tool which makes the last operation is set next to the cut-off slide, and if there are not as many successive operations required on each piece as there are tools in the turret then more than one cut-off slide is necessary, there being in short one cut-off slide to every group of tools on the turret representing one complete cycle of operations.

The cut-off slide or slides is operated by lever L, which is connected to the cut-off slide by sliding sleeve and bell-crank C, which reaches to the center of the turret, as shown, and enables the cut-off slide to be operated in all positions round the circle.

On each spindle there is a sliding cone-piece A, which moves fingers on piece B, which serves to tighten and release the chuck which holds the rod which passes through the spindle. These pieces A are moved by pivoted forks R, the ends of which reach into the common center and are connected to the sliding sleeve D, as shown. As the cut-off slide on the turret comes around to a particular spindle and the work is cut off, it is necessary to release the chuck which holds the rod in this spindle and push in the rod, so that the end shall project in front to make a new piece.

The feeding in of the rod and the tightening and loosening of the chuck is done by means of the wire-feed mechanism common to screw-machines and manipulated by lever U, sleeve D, forks R, and pieces A and B.

To prevent moving any but the particular fork or forks desired, the piece D is notched to clear the ends of all the forks but one or more, as may be intended.

To secure the blank spaces on D being opposite the forks to be moved, the sleeve D is splined on the shaft F, which passes through and is turned by the turret.

When cutting a screw-thread or tapping a hole, it is necessary to reverse the motion of the spindle when running back. This may be accomplished by reversing the countershaft; but this would reverse all the spindles and take the edge off the cutting-tools. To avoid this there are two gears O P, running in opposite directions, on each spindle, with a clutch M working between them. These clutches are moved by forks connected to central sleeve G, all similar to movement of pieces A by sleeve D.

To move the clutch on the required spindle or spindles only, the sleeve G is notched and mounted on shaft F similarly to sleeve D.

Instead of having the cut-off slide on the turret, each spindle might have its own cut-off slide, or the head H might be made to turn around instead of the turret, in which case a single cross-slide clamped on the bed could be used.

The pieces A and clutches M could be moved each by an individual lever or by an annular ring with a cam-groove to receive the ends of the forks, the rings being pulled around one space each time.

What I claim is—

1. The combination of a turret and a head-stock having a number of spindles corresponding in number and position to the tool-receptacles in the turret.

2. The combination of turret T, multiple spindle head-stock H, and cut-off slide or slides S, carried around on turret.

3. The combination of turret T and mechanism for moving cut-off slide carried thereon, substantially as shown and described.

4. The determining of position of mechanism for operating chucks, clutches, &c., on spindles by connection with turret T.

5. The combination of shaft F, sleeves D G, forks R, pieces A B, clutches M, and gears O P, running in opposite directions, substantially as described.

EDWARD JOSEPH McCLELLAN.

Witnesses:
M. E. BARNETT,
C. H. McCLELLAN.